March 9, 1937.　　　　F. HORTON　　　　2,073,405
LIQUID METER
Filed July 15, 1935　　　3 Sheets-Sheet 1

Inventor:
F. Horton
By Glascock Downing & Seebel
Attys.

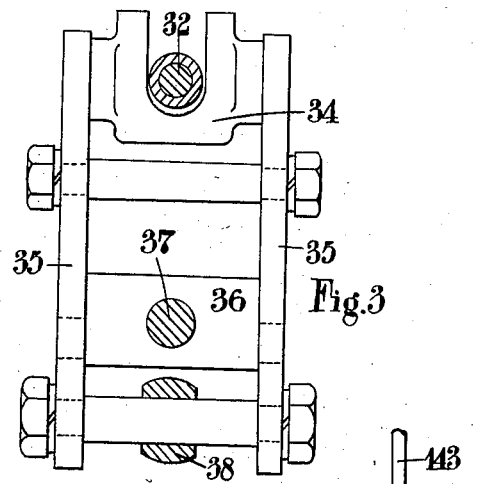
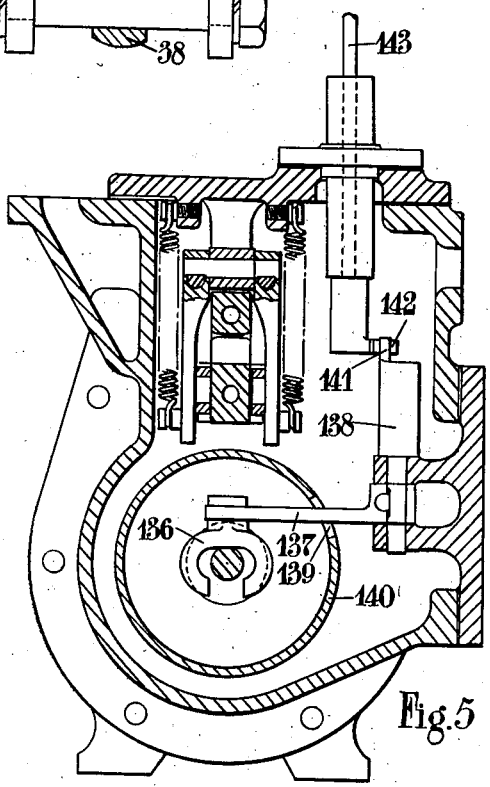

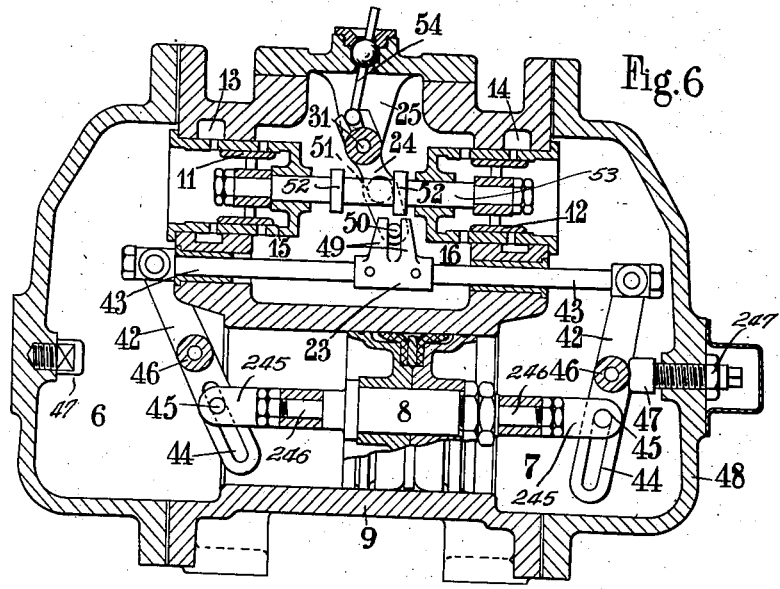
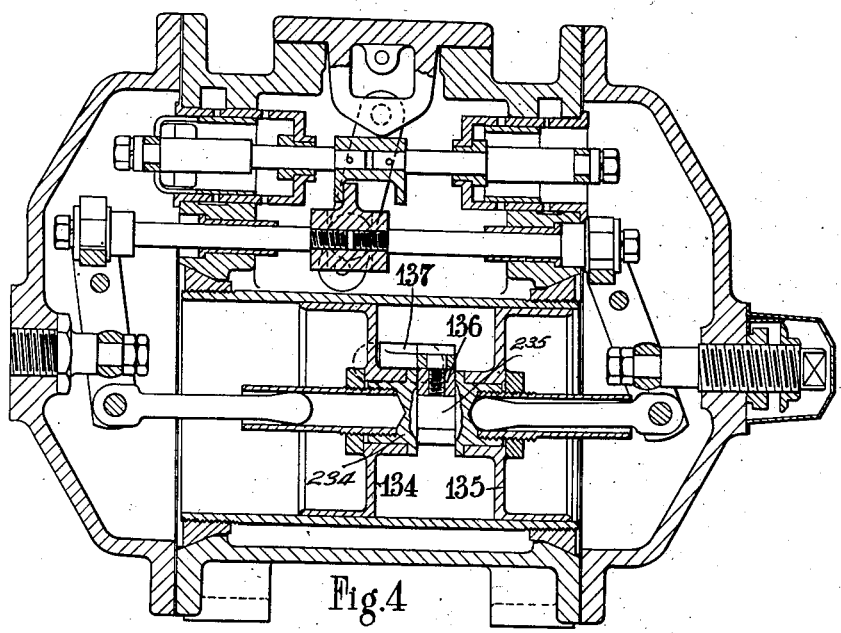

Patented Mar. 9, 1937

2,073,405

UNITED STATES PATENT OFFICE 2,073,405

LIQUID METER

Frank Horton, Balham, London, England, assignor to Foreign Rights (Precision Meters) Limited, London, England Application July 15, 1935, Serial No. 31,499
In Great Britain August 31, 1934

11 Claims. (Cl. 73—251)

This invention relates to liquid meters for automatically measuring the flow or delivery of a liquid such for example as the delivery to an oil fired furnace, and particularly to meters of the type wherein the measure of the liquid is in accordance with the stroke or displacement of a piston or like member which is operated by the pressure or head of the liquid, reversible valves controlling the flow when the piston reaches the end of the stroke.

It is known in connection with this type of meter to provide snap action means for the purpose of throwing over the valves at the appropriate moment, but it is found that while such means are effective at relative low pressures, they fail to function properly at higher pressures.

Moreover, it has been found that with this type of meter it is frequently necessary to start the meter manually after a stationary period owing to the fact that there is a "dead" spot or position of the parts in which the valves are not in a position to direct the flow of liquid correctly. With a view to avoiding this difficulty, it has been proposed to provide a plurality of valves which are governed and operated via an overcenter spring member by the displacement piston in such a manner as to ensure that one side of the piston is open to inlet and the other to exhaust.

It is an object of the invention to provide an improved liquid meter of the type described (having a single piston), which functions correctly at all pressures and in which it is impossible for the parts to stop in a position such that they require manual attention before the meter will again operate.

The invention consists in a liquid meter wherein the measure of the liquid is in accordance with the stroke or displacement of a piston operated by the pressure of the liquid, comprising a single piston element, snap action means operating with a delayed action for actuating the valves when the meter is operating under low pressures, and means actuated by the piston for operating the valves by the piston at high pressures, independently of the snap action means.

Further features of invention will be hereinafter described.

In the accompanying drawings:—

Figure 3 is a partial end elevation, the cover being removed.

Figures 4 and 5 are sectional and cross sectional elevations, respectively, of a modified form adapted to a continuously moving indicator.

Figure 6 is a sectional elevation of a further modification.

Figure 2:
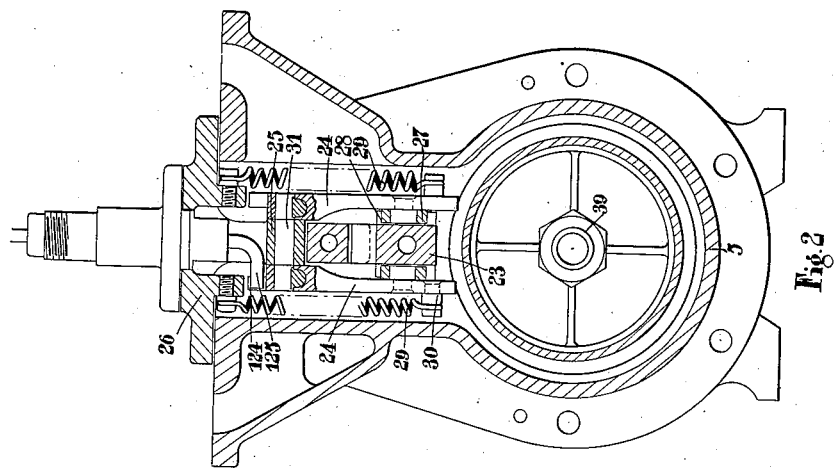
Figure 2 is a cross sectional elevation corresponding thereto.

In carrying the invention into effect according to one convenient mode, a casing 5 is provided having a pair of chambers 6 and 7 separated by a piston 8 which reciprocates in a cylinder or bore 9 the ends of which open into the chambers. The cylinder 9 is mounted in the casing 5 by rings 9a, 9b.

The chambers 6 and 7 extend upwardly on either side of a central exhaust or delivering chamber 10, which is located above the cylinder or bore. Communication between the chambers 6 and 7 and the exhaust chamber is controlled by a pair of sleeve valves 11 and 12 connected together whereby the valves move as a unit. Pressure ducts 13 and 14 adapted to be connected to a source of fluid under pressure are located in the casing between the chambers 6 and 7 and the exhaust chamber, such ducts being controlled by the valves 11 and 12 respectively.

The valves reciprocate axially in a direction parallel to the axis of the cylinder, and are seated in sleeves or cup members 15 and 16 inserted inwardly in bores in the casing. The cup members are provided with circumferentially arranged series of inlet ports 15a, 16a and exhaust ports 15b, 16b which communicate with the pressure ducts 13, 14 and exhaust chamber 10 respectively. The inner ends of the cup members are closed and are bored to provide bearings for the valve rods 17 and 18.

The coupling of the valves is effected by a central block 19 which is threaded to receive the ends of the valve rods. The block 19 is provided with a pair of lugs 20 and 21 by means of which the valves may be thrown over.

These lugs are adapted to be engaged by the snap action device through a projection 22 on a cross head 23. The lugs 20 and 21 are spaced apart so that there is lost motion between them and the projection 22. The snap action device comprises a pair of levers 24 pivotally mounted at their upper ends by a pin 31 in a bearing formed by a depending bracket 25 on a closure 26 for the exhaust or delivery chamber. At their lower ends the levers carry rollers 27 engaging in vertical slots 28 in the reciprocating cross head 23. The springs 29 of the snap action device are connected at one end to pins 30 carried by the levers and located beneath the rollers 27 and at the other ends to the cover 26 above the pivots of the levers.

The cross head 23 is secured to a pair of cross head rods 32 arranged in axial alignment and located between the valves and piston and arranged for axial reciprocation. The rods 32 pass through bearings in the casing. At their outer ends the rods are provided with spaced collars 33 which are engaged by U-pieces 34 pivotally mounted upon links 35 which are fulcrumed upon blocks 36 carried by supports 37 projecting into the side chambers.

At their lower ends the links 35 are pivotally connected to rods 38 which project into tubular piston rods or sleeves 39. The rods 38 are provided with ball ends to permit a rocking movement between the rods and the rod sleeves 39. The inner or ball ends of the rods 38 are provided with passages 238 to allow liquid to escape past said ball ends.

The lengths of the rods 38 and disposition of the parts is such as to provide lost motion permitting relative movement between the piston and the rods 38 so as to avoid excessive movement of the parts which would occur if the rods were positively coupled to the piston which would result in an unwieldy meter. The piston is provided with bearing pieces 40, 41 adapted to contact with the rods 38 near the ends of its strokes.

Figure 1:
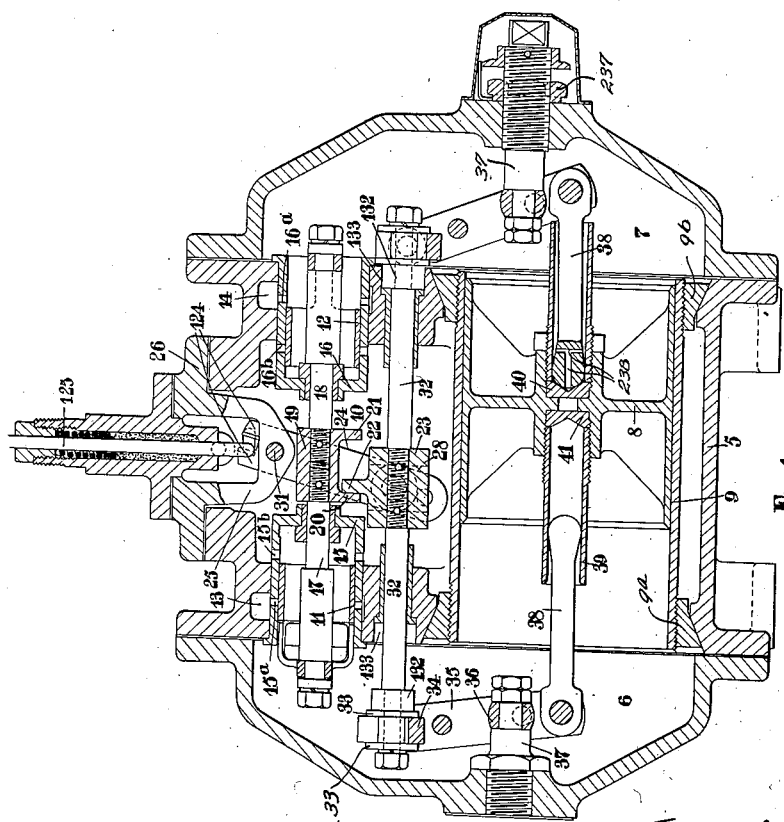
Figure 1 is a sectional elevation of a meter according to the invention.

The right hand support 37 (as seen in Fig. 1) is adjustable to vary the fulcrum for the links 35 so that the stroke of the piston may be accurately determined. This adjustment is effected by screwing the support 37 in the end wall of chamber 7, a lock nut 237 being provided for locking the support in its adjusted position.

In operation, assuming the piston to be moving from right to left (as seen in Figure 1) the right hand chamber 7 is under pressure and the left hand chamber 6 in communication with the exhaust or delivery 19, the valves 11 and 12 are now in the extreme left position. As the piston moves it approaches the left hand rod 38 until it contacts therewith through the bearing piece 41. Further movement of the piston causes the links 35 at the left end to pivot and thus move the cross head 23 to the right. This movement continues until the axes of the rollers 27 and the snap action levers 24 reach the dead centre.

The mounting of the levers 24 upon the pivot pins 31, in contradistinction to the usual knife edge or other frictionless mounting, acts to retard or delay the snapping action due to the friction being in the pivot pin 31 and its bearings so that movement of the parts by the piston continues, bringing the lug 22 into contact with lug 21, moving the valve over until a position is reached when the piston is nearly at the end of its stroke when the springs 29 produce the final change over of the valve.

Such action occurs when the meter is operating under relatively low pressures.

Should the meter be operating under high pressures, the rate of movement of the piston will be much quicker, and the cross head through the piston will effect a positive action of the valves as the piston will cause the lug 22 to engage the collar lug 21 (or 20 as the case may be) and throw over the valves before the springs have had time to act owing to the lag or delay in the action of the springs due to the friction between the levers 24 and their pivot pin 31. Buffer devices for the cross head may be provided at the end of the strokes comprising collars 132 movable with the rods 32 into recesses 133 in the bearings for rods 32.

One of the levers of the snap action device may be provided with spaced horns 124 adapted to engage the cranked lower end of a rocking lever or oscillating spindle 125 coupled to a counting mechanism mounted exteriorly of the meter.

In the form of meter illustrated in Figures 4 and 5 a pair of spaced piston heads 134, 135 is provided which are connected together and between which a transversely sliding block 136 is mounted. The piston heads are connected together by a central spacing member 234 having a reduced portion 235 on which the block 136 is mounted. The block is pivotally connected to one end of an arm 137 rigidly mounted upon a vertical rock shaft 138. The arm projects through a slot 139 in the cylinder 140. At the upper end of the rock shaft a finger 141 is provided which lies within a fork 142 carried by an oscillating spindle 143.

It will be appreciated that the movements of the spindle 143 will be of a continuous nature corresponding to the movements of the pistons in contradistinction to the stepping motion of the spindle 125 of Fig. 1. The spindle is connected through a double ratchet or clutch device to an indicator or pointer so that the oscillation of the spindle causes a unidirectional movement of the pointer.

By these means the meter may be utilized for dispensing predetermined quantities of liquids, the attendant watching the pointer and shutting off the inlet to the meter when the pointer reaches the desired indication or number on a dial.

Apart from the arrangement of the modification of the pistons and the registering mechanism the details of the construction of the meter are the same as those illustrated in Figures 1 to 3.

According to the modification shown in Figure 6, the lost motion between the piston 8 and the cross head 23 is obtained by floating links 42 pivotally mounted upon the cross head rods 43. These links are coupled to the piston by a slot and pin connection 44, 45. The pins 45 are carried by forked elements 245 which are mounted upon the reduced ends 246 of the piston rods. Intermediate their ends the links 42 are each provided with a fulcrum roller 46 which is adapted to engage a fulcrum abutment 47 mounted upon the closure 48. One of the abutments 47 is screwed into the casing and locked by a lock nut whereby the stroke of the piston may be adjusted.

The cross head 23 is provided with upstanding horns 49 which engage opposite sides of a pin 50 carried by the snap action levers 24. The snap action device is similar to that shown in Fig. 1 and the levers 24 are pivoted upon a pin 31 carried by the bracket 25 and intermediate their ends are provided with projections 51 adapted to engage spaced collars 52 on the valve rod 53. The valves 11 and 12 comprise sleeves having a central boss by which they are mounted upon the valve rod 53.

The parts are shown in the position in which the left hand chamber 6 is under pressure and the fulcrum roller 46 of the right hand lever 42 in engagement with its fulcrum abutment 47. On continued movement of the piston to the right the lever 42 is pivoted about the axis of the roller 46 to cause a movement to the left of the cross head. The horns 49 engaging the pin 50 rock the snap action levers 24 bringing the projections 51 into engagement with the left hand collar 52. This moves the valves to the left, the final movement, when operating under low pressure, being effected by the snap action device. Under high pressures, as in the previous modifications, the throw-over of the valves will be effected positively before the springs of the snap action device have had time to act.

One of the snap action levers is adapted to actuate the rocking lever 54 for a counting mechanism.

Having now described my invention, what I claim as new and desire to secure by Letters Patent is:—

1. A liquid meter wherein the measure of the liquid is in accordance with the displacement of a pressure responsive element actuated by the pressure of the liquid comprising a pair of chambers, a cylinder located between and communicating with said chambers, a piston reciprocating in said cylinder, valve means controlling the flow of liquid into and from said chambers, snap action means including means delaying its operation after reaching the dead centre position, said snap action means actuating the valve means at low pressures and means located between the piston and said snap action means for actuating the snap action means and being capable of actuating the valve means independently of the snap action means when the meter is operating at high pressures.

2. A liquid meter wherein the measure of the liquid is in accordance with the displacement of a pressure responsive device operated by the pressure of the liquid, comprising a pair of chambers, a pressure responsive element separating said chambers, valve means controlling the flow of liquid into and from the chambers, a reciprocating crosshead, a lost-motion transmission operatively connecting the pressure responsive element with said crosshead, interengaging means including a lost motion connection between the crosshead and valve means, a snap action device including means for delaying its operation after reaching the dead centre position, said snap action means actuating the valve means at low pressures, and being operatively connected to the crosshead, the crosshead being capable of actuating the valve means independently of the snap action means when the meter is operating under high pressure.

3. A liquid meter wherein the measure of the liquid is in accordance with the displacement of a pressure responsive element operated by the pressure of the liquid, comprising a pair of chambers, a cylinder located between and communicating with said chambers, a piston reciprocating in said cylinder, valves controlling the flow of the liquid into and from the chambers, snap action means for actuating the valves at low pressures, said means comprising a bearing spindle, levers frictionally pivotally mounted upon said spindle whereby said device operates with a delayed action after reaching its dead centre position, and means operated by the piston for actuating the snap action means and being capable of actuating the valves independently of the snap action means when the meter is operating at high pressures.

4. A liquid meter operated by the pressure of the liquid comprising a pair of chambers, a cylinder located between and communicating with said chambers, a piston reciprocating within said cylinder, valve means controlling the flow of liquid into and from the chambers, a reciprocating crosshead, a lost motion transmission, operatively connecting the crosshead with the piston, interengaging means including a lost motion connection between the cross head and valve means, and a snap action device including means delaying its operation after reaching the dead centre position, said snap action device being operatively connected to the crosshead, said snap action device actuating the valve means at low pressures, said crosshead being capable of actuating the valve means independently of the snap action means when the meter is operating at high pressure.

5. A liquid meter as claimed in claim 4, wherein the lost motion transmission includes a reciprocating bar parallel to the piston axis and upon which the cross head is mounted, levers pivotally connected to the end of the bar, rods pivoted to the other ends of the levers, sleeves on the piston into which said rods telescope, the inner ends of the rods being spaced, and an abutment on the piston adapted successively to engage the inner ends of said rods towards the ends of the strokes of the piston.

6. A liquid meter as claimed in claim 4, wherein the valve means comprises a pair of spaced sleeve valves, and the lost motion connection comprises a block intermediate the sleeve valves and connected thereto, spaced projections on said block and a projection on the crosshead located between the projections on the block and by which the valves are reciprocated.

7. A liquid meter as claimed in claim 4, wherein the piston comprises a pair of spaced heads, a rock shaft, a lever carried by the rock shaft, a coupling mounted between said spaced heads and connected to said lever, whereby the movements of the piston are transmitted to the rock shaft adapted to operate an indicator.

8. A liquid meter operated by the pressure of the liquid comprising a pair of chambers, a cylinder located between said chambers and communicating therewith, a piston reciprocating in said cylinder, a delivery chamber, valve means controlling the flow of liquid into, and out of, said pair of chambers to said delivery chamber, snap action means including means for delaying its operation after reaching the dead centre position, said snap action means being located in the delivery chamber for actuating the valve means at low pressures, and means located between said snap action means and said piston for actuating the snap action means and being capable of actuating the valve means independently of the snap action means when the meter is operating at high pressures.

9. A liquid meter as claimed in claim 8 wherein the delivery chamber is provided with a closure cap, bearings in said cap, a spindle in said bearings, a pair of spaced levers carried by said spindle, and springs connected to the free ends of levers and to said closure cap, said levers and springs forming the snap action means.

10. In a liquid meter as claimed in claim 2, wherein a rod carries the crosshead, bearings for said rod, said bearings having recesses, and buffer elements on said rod adapted to engage in said recesses at the ends of the reciprocations.

11. A liquid meter operated by the pressure of the liquid, comprising a pair of chambers, a cylinder the ends of which are connected to said chambers, a piston element having a piston rod and reciprocable in said cylinder under pressure of the liquid, valve means controlling the flow of liquid into or out of said chambers, a reciprocating crosshead including a rod, levers pivotally connected to the ends of said rod, means including pin and slot connections connecting said levers to the ends of the piston rod, said levers having fulcrum elements, fixed abutments adapted for engagement by said fulcrum elements, snap action means operating with a delayed action, operatively connected to said crosshead, and interengaging means between the snap action means and said valve means.

FRANK HORTON.